US012574840B2

(12) United States Patent
Hashmi et al.

(10) Patent No.: US 12,574,840 B2
(45) Date of Patent: Mar. 10, 2026

(54) FACILITATING CELL AND CARRIER SWITCH OFF FOR ENERGY AWARENESS IN ADVANCED COMMUNICATION NETWORKS

(71) Applicant: Dell Products L.P., Round Rock, TX (US)

(72) Inventors: Umair Sajid Hashmi, Mississauga (CA); Gwenael Poitau, Montreal (CA); Jeebak Mitra, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 267 days.

(21) Appl. No.: 18/337,594

(22) Filed: Jun. 20, 2023

(65) Prior Publication Data

US 2024/0430793 A1     Dec. 26, 2024

(51) Int. Cl.
*H04W 52/02* (2009.01)
*G06N 3/098* (2023.01)
*H04L 41/0803* (2022.01)

(52) U.S. Cl.
CPC ........ *H04W 52/0203* (2013.01); *G06N 3/098* (2023.01); *H04L 41/0803* (2013.01)

(58) Field of Classification Search
CPC . H04W 52/00; H04W 52/02; H04W 52/0203; H04W 52/0206; H04W 28/0221;
(Continued)

(56) References Cited

U.S. PATENT DOCUMENTS

2002/0006167 A1 * 1/2002 McFarland .......... H04L 1/0034
375/377

2011/0116467 A1 * 5/2011 Jung ................. H04W 72/0453
370/329
(Continued)

FOREIGN PATENT DOCUMENTS

CN      114499790      * 10/2020 ............... H04L 5/00
EP      4 242 939 A1     9/2023
(Continued)

OTHER PUBLICATIONS

International Search Report and Written Opinion received for PCT Application Serial No. PCT/US2023/036197 dated Mar. 19, 2024, 18 pages.

(Continued)

*Primary Examiner* — Warner Wong
(74) *Attorney, Agent, or Firm* — Amin, Turocy & Watson, LLP

(57)                ABSTRACT

Facilitating cell and carrier switch off for energy awareness in advanced communication networks is provided herein. A method includes determining a first result of a utility function associated with a first configuration of a set of carriers that service a group of user equipment in a communication network. The first configuration is based on respective activation states of carriers of the set of carriers. The method also includes, based on respective traffic patterns of user equipment of the group of user equipment, evaluating respective results of the utility function for respective configurations of a group of configurations, other than the first configuration, for the set of carriers. Further, the method includes selecting a second configuration from the group of configurations based on a second result of the utility function for the second configuration being determined to be a higher value than a value of the first result.

20 Claims, 9 Drawing Sheets

(58) Field of Classification Search
CPC ....... H04W 36/165; H04W 52/280412; H04W 12/5678; G06N 3/00; G06N 3/02; G06N 3/08; G06N 3/098; H04L 1/0044; H04L 43/00; H04L 43/062; H04L 41/08; H04L 41/0803
See application file for complete search history.

(56) References Cited

U.S. PATENT DOCUMENTS

| | | | | |
|---|---|---|---|---|
| 2011/0128901 A1* | 6/2011 | Lee | ................... | H04W 52/0216 |
| | | | | 370/311 |
| 2012/0244869 A1* | 9/2012 | Song | ................. | H04W 52/0206 |
| | | | | 455/449 |
| 2013/0310048 A1* | 11/2013 | Hunukumbure | .. | H04W 52/0206 |
| | | | | 455/443 |
| 2022/0225151 A1* | 7/2022 | Zhang | ................... | H04W 24/10 |
| 2023/0082416 A1* | 3/2023 | Tuck | ................... | H04W 52/283 |
| | | | | 455/456.1 |
| 2023/0188233 A1* | 6/2023 | Gupta Hyde | ...... | H04B 17/3913 |
| | | | | 370/329 |
| 2023/0362809 A1* | 11/2023 | Dixit | ..................... | H04W 24/10 |

FOREIGN PATENT DOCUMENTS

| | | | | | | |
|---|---|---|---|---|---|---|
| WO | WO-2010145130 A1 | * | 12/2010 | | ............ | H04W 72/52 |
| WO | 2022/111068 A1 | | 6/2022 | | | |
| WO | 2023/007417 A1 | | 2/2023 | | | |
| WO | WO-2023075665 A1 | * | 5/2023 | | ............ | H04B 17/25 |

OTHER PUBLICATIONS

Ericsson, "AI/ML for Energy Efficiency use Case Discussion", 3GPP TSG-RAN WG3 Meeting #112-e, R3-212315, May 17-27, 2021, 11 pages.
O-RAN Alliance, "O-RAN Working Group 1 Use Cases Analysis Report", O-RAN.WG1.Use-Cases-Analysis-Report-v08.00, Jul. 2022.
NGMN Alliance "Green Future Networks—Network Energy Efficiency" v1.1 www.ngmn.org, Dec. 7, 2021, 56 pages.

Ali Imran, et al. "Challenges in 5G: How to Empower SON with Big Data for Enabling 5G" IEEE Network, vol. 28, No. 6, pp. 27-33, Nov.-Dec. 2014, doi: 10.1109/MNET.2014.6963801, 8 pages.
O-RAN Alliance, "O-RAN Work Group 1 (Use Cases and Overall Architecture) Network Energy Saving Use Cases Technical Report.", Nov. 2022.
Mwanje et al., "Distributed energy saving management in multi-layer 4G/5G ultra-dense networks," 2018 IEEE Wireless Communications and Networking Conference Workshops (WCNCW), 2018, pp. 143-148, doi: 10.1109/WCNCW.2018.8368972.
Morabit et al., "Small cell switch off using genetic algorithm," 2017 International Conference on Advanced Technologies for Signal and Image Processing (ATSIP), 2017, pp. 1-4, doi: 10.1109/ATSIP.2017.8075586.
Tan et al., "Energy Saving Technologies and Best Practices for 5G Radio Access Network," in IEEE Access, vol. 10, pp. 51747-51756, 2022, doi: 10.1109/ACCESS.2022.3174089.
Borgwardt et al., "Integrating structured biological data by kernel maximum mean discrepancy," Bioinformatics, vol. 22, No. 14, pp. 49-57, Jul. 2006.
Kullback et al., "On information and sufficiency," Ann. Math. Statist., vol. 22, No. 1, pp. 79-86, 1951.
Shen et al., "Wasserstein distance guided representation learning for domain adaptation," in Proc. 32nd AAAI Conference on Artificial Intelligence, New Orleans, Feb. 2018, pp. 4058-4065.
Zellinger et al., "Central moment discrepancy (CMD) for domaininvariant representation learning," in Proc. 5th International Conference on Learning Representations, Toulon, Apr. 2017, pp. 1-13.
Qi et al., "Intent-Aware Multi-Agent Reinforcement Learning," 2018 IEEE International Conference on Robotics and Automation (ICRA), Brisbane, QLD, Australia, 2018, pp. 7533-7540, doi: 10.1109/ICRA.2018.8463211.
Wang et al., "Dueling network architectures for deep reinforcement learning," in Proc. Int. Conf. Mach. Learn., Jun. 2016, pp. 1-6.
Tavakoli et al., "Action branching architectures for deep reinforcement learning," in Proceedings of the AAAI Conference on Artificial Intelligence, vol. 32, No. 1, 2018.
International Preliminary Report on Patentability received for PCT Application Serial No. PCT/US2023/036197 dated Jan. 2, 2026, 11 pages.

* cited by examiner $$\min \sum_{t=0}^{t=T-1} \left[\frac{Activated\ Carriers}{NumCarriers}\right]^{\alpha} [QoS\ Dissatisfaction\ Rate]^{1-\alpha}; 0 \leq \alpha \leq 1 \quad (1)$$

$$S(t) = \{S_1(t),\ S_2(t), S_3(t),\ \ldots,\ \}^N, \qquad (2)$$

where $S_1(t)$ denotes current operating load per carrier, $S_2(t)$ denotes future predicted load per carrier through xApp, $S_3(t)$ denotes average SINR per carrier, $S_4(t)$ denotes average latency per carrier, $S_5(t)$ denotes neighbors' current operating load per carrier, and $S_6(t)$ denotes current operating state of adjacent carriers (may select the closest 2-3 carriers)

$$A(t) = \{OS_1(t), OS_2(t), \ldots, OS_N(t)\}. \quad (3)$$

FIG. 6

$$Action\ Space = \left\{ \begin{array}{l} Toggle\ Carrier\ 1\ OS \\ Toggle\ Carrier\ 2\ OS \\ \vdots \\ Toggle\ Carrier\ N\ OS \\ No\ change\ is\ OS\ for\ any\ Carrier \end{array} \right. \quad (4a)$$

$$|Actions| = |Carriers| + 1 = N + 1\ ;\quad (4b)$$

$$R^t = \begin{cases} e^{\zeta(u^t - 1)}, & \text{for valid action} \\ Z; & \text{for invalid action} \end{cases}; \zeta > 1, Z \in [-1, 0] \qquad (5)$$

where $$u^t = \sum_{t=0}^{t=T-1} \left[ 1 - \frac{Activated\ Carriers}{NumCarriers} + \epsilon \right]^\alpha [QoS\ Satisfaction\ Rate]^{1-\alpha};$$

$$0 \le \alpha \le 1, 0 < \epsilon \ll 1 \qquad (6)$$

FACILITATING CELL AND CARRIER SWITCH OFF FOR ENERGY AWARENESS IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), power consumption in such networks is higher as compared to Long Term Evolution (LTE) networks, for example. Such power consumption can be attributed to the exponential increase in the network traffic flowing through the advanced network and the need for faster processing of complex tasks. Accordingly, unique challenges exist related to network efficiency and in view of forthcoming Fifth Generation (5G), New Radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a method is provided that includes determining, by a system comprising a processor, a first result of a utility function associated with a first configuration of a set of carriers that service a group of user equipment in a communication network. The first configuration is based on respective activation states of carriers of the set of carriers. The utility function is based on a power consumption of the set of carriers and a quality of service target for the group of user equipment. The method also includes, based on respective traffic patterns of user equipment of the group of user equipment, evaluating, by the system, respective results of the utility function for respective configurations of a group of configurations, other than the first configuration, for the set of carriers. Further, the method includes selecting, by the system, a second configuration from the group of configurations based on a second result of the utility function for the second configuration being determined to be a higher value than a value of the first result.

In an example, the system can be implemented within a disaggregated architecture that comprises central units, distributed units, and a near-real-time-radio access network intelligent controller. In another example, the communication network can be configured to operate according to a new radio network communication protocol. In yet another example, the communication network can configured to operate according to at least a 5G network communication protocol.

Determining the first result can include deriving the power consumption of the set of carriers based on a ratio of a first amount that represents a number of carriers in a fully active state and a second amount that represents a total number of carriers in the communication network. The total number of carriers can include a first quantity of carriers in an active mode and a second quantity of carriers in a sleep mode.

Evaluating the respective results of the utility function for respective configurations of a group of configurations can include employing, by the system, artificial intelligence to simulate toggling of a state of at least one carrier of the set of carriers between an active state and an inactive state. In another example, the evaluating can include using a metric based on a long-term performance expectation as an objective of the utility function. In alternative or additional implementations, the evaluating can include determining the first result and the second result based on the utility function being a combination of respective metrics representative of the power consumption, a latency, and a performance of the communication network.

According to an implementation, the method can include aggregating, by the system, respective weights of local models, resulting in a centralized model. The local models are associated with energy saving groups comprising network equipment. The method can also include updating, by the system, a global model based on the centralized model. In an example, the local models are federated learning models, transfer learning models, or both federated learning models and transfer learning models.

Another embodiment relates to a system that includes a processor and a memory that stores executable instructions that, when executed by the processor, facilitate performance of operations. The operations can include, based on respective traffic patterns of user equipment of a group of user equipment, evaluating respective results of a utility function for respective configurations of a group of configurations of a set of carriers that service the group of user equipment in a communication network. The utility function is based on a power consumption of the set of carriers and a quality of service target for the group of user equipment. The operations can also include, based on a result of the utility function for one configuration of the group of configurations being determined to have a first value that is more than a second value of a current result of the utility function, implementing the one configuration in the communication network. The group of configurations can include different combinations of active and inactive carriers of the set of carriers. In an example, the system can be deployed in a disaggregated architecture of network equipment.

According to an implementation, evaluating the respective results can include initiating a local model with initial parameters via transfer learning and training the local model with an aggregation of global model parameters via federated learning. Further to this implementation, the operations can include receiving feedback data associated with the implementing of the one configuration and retraining the local model based, at least in part, on the feedback data.

In some implementations, evaluating the respective results can include using a metric based on a long-term performance expectation as an objective of the utility function. In an example, the respective results of the utility function are based on a combination of respective metrics representative of the power consumption, a latency, and a performance of the communication network for the respective configurations.

According to another embodiment, provided herein is a non-transitory machine-readable medium, comprising executable instructions that, when executed by a processor of network equipment, facilitate performance of operations. The operations can include determining a first result of a utility function associated with a first configuration of a set of carriers that service a group of user equipment in a communication network. The first configuration is based on respective activation states of carriers of the set of carriers. Further, the utility function is based on a power consumption of the set of carriers and a quality of service target for the group of user equipment. The operations can also include, based on respective traffic patterns of user equipment of the group of user equipment, evaluating respective results of the utility function for respective configurations of a group of configurations, other than the first configuration. Further, the operations can include selecting a second configuration from the group of configurations based on a second result of the utility function for the second configuration being determined to be increased as compared to the first result.

In an implementation, evaluating the respective results can include initiating a local model with initial parameters via transfer learning and training the local model with an aggregation of global model parameters via federated learning. Alternatively or additionally, the evaluating can include determining the first result and the second result based on the utility function being a combination of respective metrics representative of the power consumption, a latency, and a performance of the communication network.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 2 illustrates a first equation (1) for a user admission rate in accordance with one or more embodiments described herein;

FIG. 5 illustrates a second equation (2) that represents a state space vector in accordance with one or more embodiments described herein;

FIG. 6 illustrates a third equation (3) that represents an action space in accordance with one or more embodiments described herein;

FIG. 8 illustrates equations (5) and (6) that represent a long-term reward function in accordance with one or more embodiments described herein;

DETAILED DESCRIPTION

Figure 1:
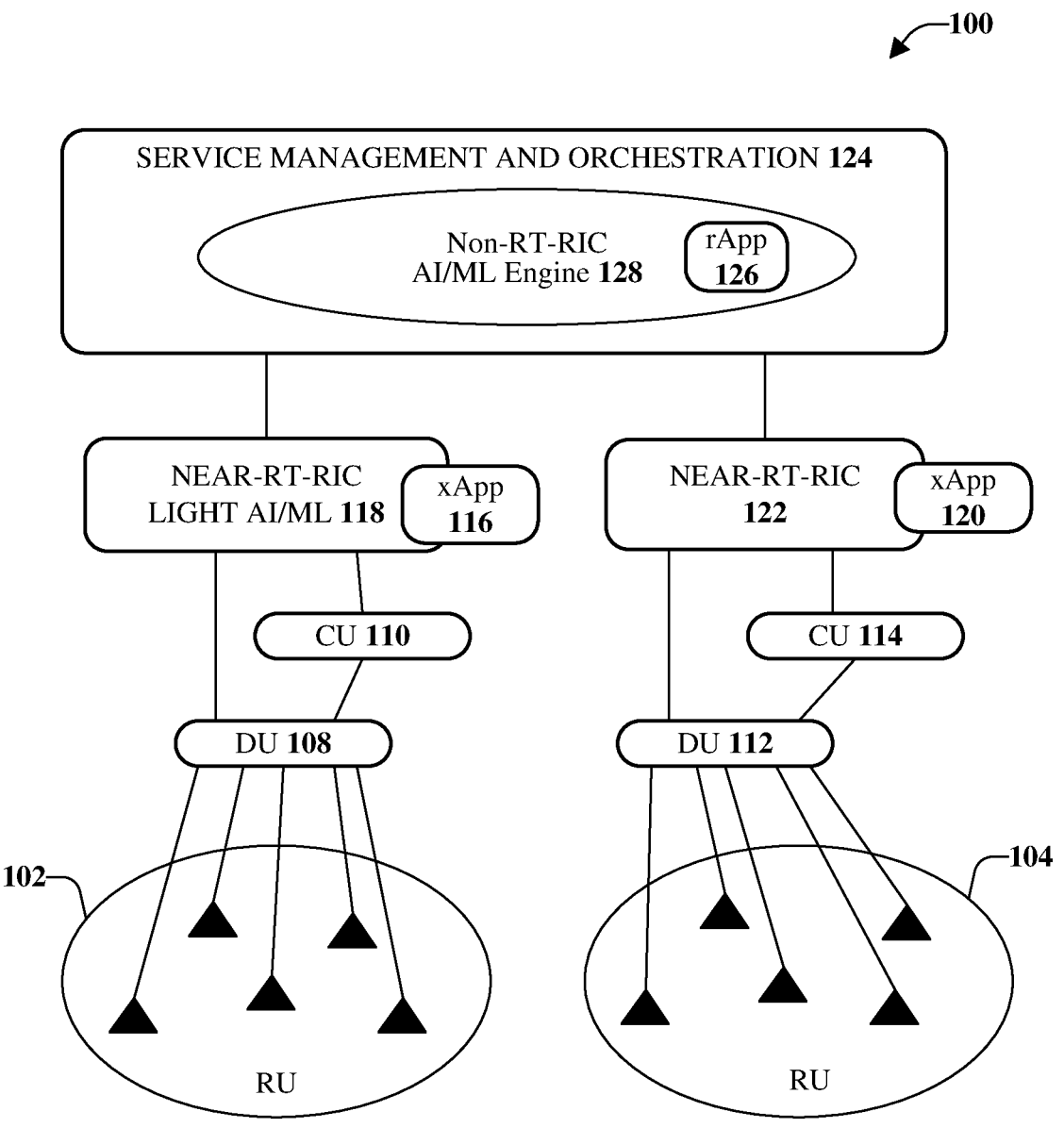
FIG. 1 illustrates an example, non-limiting, system architecture for cell and/or carrier switching in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The high energy consumption of fifth generation (5G) networks is a source of concern for various reasons. For example, the high energy consumption can increase the operators' operational expenditure (OPEX). In another example, the high energy consumption can increase carbon dioxide ($CO_2$) emissions, which can be in direct conflict with environmentally friendly policies adopted by governments and companies around the globe. It is noted that static energy saving techniques are not effective for mobile networks that have fluctuating traffic loads and user mobility patterns. Multiple energy saving (ES) features, such as deep sleep mode, carrier shut down, and radio frequency (RF) channels' switch off can be available. However, due to the large parameter space involved in the energy minimization process, the ensuing optimization problem becomes non-polynomial-hard (NP-hard), which utilizes significant computation for yielding optimal parameters.

Recently, ES on shorter time scales have been proposed in academia as well as industry standards. These proposals include at symbol-level, subframe-level, and/or frame-level advanced sleep modes (ASM). The challenge for mobile operators, as well as standardization bodies, is to streamline processes for energy efficiency (EE) specific use cases, such as activation and/or deactivation of sleep mode functionality and site energy management.

To overcome the above as well as related issues, the data driven approaches discussed herein, when trained with sufficient and appropriate data, can outperform classical optimization techniques in terms of performance and real-time inferences. Provided are techniques for leveraging artificial intelligence (AI) and/or machine learning (ML) for EE without any noticeable impact (e.g., negligible impact) on the user Quality of Experience (QoE), which, until now, has been an unexplored field of knowledge as it relates to communication networks.

An ES use cases is a carrier and/or cell switch on and/or off (e.g., toggle). ES can be attained by switching off one or more carriers, or even entire cells at low load levels. An associated decision managed by the respective E2 node is how to offload the existing users of the carrier (or cell) to new carriers (or cells) without impacting user experience. However, making this decision is not a trivial task due to conflicting targets between user satisfaction and energy efficiency. As the users are relocated to new cells and/or carriers, the load dependent power consumption of those new cells and/or carriers increases. Thus, while energy savings for the switched off carrier and/or cell is maximized, the overall energy consumption of the network might even increase. Therefore, any carrier and/or cell switch off strategy, whether implemented by an AI interface and/or ML inference host at a Non-Real-Time-Radio Access Network intelligent Controller (NR-RT-RIC) or a Near-Real-Time-Radio Access Network intelligent Controller (Near-RT-RIC), should consider overall network efficiency in addition to local optimization at cell level.

Provided herein is an AI based solution to optimize different ES and/or EE solutions. In this regard for the avoidance of doubt, any embodiments described herein in the context of optimizing solutions and/or performance are not so limited and should be considered also to cover any techniques that implement underlying aspects or parts of the described aspects to improve or increase various solutions and/or performance, even if resulting in a sub-optimal variant obtained by relaxing aspects or parts of a given implementation or embodiment.

A premise of the AI based solution use cases provided herein is to enable the reduction and/or mitigation of power consumption at a Control Unit (CU) level, a Data Unit (DU) level, and/or Radio Unit (RU) level via switching off one or more carriers and/or cells. Before such an activity takes place, user equipment (UEs) camped on the particular carrier and/or cell which is to be switched off should be offloaded adequately to other carriers and/or cells. Provided are various types of learning models in the various processes, which include deep reinforcement learning, transfer learning, and federated learning. Transfer learning is an approach involving reuse of a previously trained model on a large dataset for a new but smaller dataset in order to accomplish similar or different tasks. Using gained knowledge from an extensive dataset allows for reliable training on limited datasets with the added benefit of lower computational time and reduced cost for building models. On the other hand, federated learning keeps local data confidential and does not require all the data to be collected in a single location. Each local agent trains a local model with the available data, and periodically sends the trained model parameters to a global agent, which aggregates the model parameters to build a global model. The parameters of the improved global model are sent back to the local agents for refining their local models and improving the model performance without risk of confidential data breach and reduced network overhead for data transfer to a cloud computing environment.

Provided herein is a signaling framework within a disaggregated architecture of network equipment (e.g., an Open Radio Access Network (O-RAN) architecture or other type of disaggregated architecture) for cell and/or carrier switch off with AI inference hosts in both near-RT and non-RT RICs. Also provided are utilization of a learning framework where RL based models are deployed at near-RT-RIC to perform cell and/or carrier switch off decisions. To facilitate the decision making, concepts from federated learning and transfer learning are utilized to improve performance with model enhancement coming from parameter transfer from non-RT RIC.

The objective of cell and/or carrier switch off in each Base Station (BS) is to maximize the energy efficiency. As the number of UEs within the network footprint and the associated mobility patterns change (e.g., a configuration change), the load per carrier fluctuates accordingly. While shutting down some cells and/or carriers and allowing traffic to flow through the remaining cells and/or carriers would be ideal, there may be issues of interference and Quality of Service (QOS) degradation due to highly loaded carriers. Also, the overall power consumption of the network may increase when some cells and/or carriers are shut down due to higher load dependent power on the other cells. To jointly optimize EE and also ensure QoS constraints are met, a process optimizing a utility function taking both power consumption as well as the device dependent performance indicators (e.g., key performance indicators (KPIs)) are provided. An example of those KPIs could be user perceived throughput (UPT) for eMBB devices, access delay or latency for URLLC devices, and number of packets transmitted for mMTC devices. To avoid frequent cell and/or carrier switching, it is prudent to keep the long-term performance as the objective of the optimization, instead of optimizing the immediate/instantaneous performance. For this purpose, the average number of handovers in case of cell and/or carrier switch off can be an optimization constraint according to some embodiments.

In the context of the disclosed embodiments, the cell and/or carrier switch off issue can be sub-divided into various sub-problems. For example, designing an objective function that optimizes the long-term energy efficiency of a group of cells along with maintaining QoS standards defined for the device category of each UE within the cell cluster can be a concern.

In another example, to capture the dynamic environment of a mobile network, online learning approaches which constantly (or based on some other time interval) receive updated data are more suited as compared to static datasets. Moreover, reinforcement learning based algorithms learn based on their interaction with the environment through feedback of their actions. The challenge here is how to devise a method for deploying a reinforcement learning (RL) based solution at RAN intelligent controllers: non-real-time-RIC (Non-RT RIC), and near real-time-RIC (Near-RT-RIC or nRT-RIC) including developing inference learning models that can be deployed on both RICs and are consistent with the operational timescales of the RICs.

In yet another example, defining the control flow between elements of the disaggregated architecture can be a challenge. Such control flow can include relevant data from the RU to the RICs, model training, model deployment, and the cell and/or carrier switch off configuration from the application modules (rApp and/or xApp).

As it relates to cell and/or carrier switch off for Long Term Evolution (LTE), 5G, 6G, NR, and other advanced networks, an AI based policy for intelligent cell and/or carrier switch off based on network traffic patterns is provided herein. An objective of cell and/or carrier switch off in each BS is to maximize energy efficiency. As the number of UEs within the network footprint and the associated mobility patterns change, the load per carrier fluctuates accordingly. While it would be ideal to shut down some cells and/or carriers and allow traffic to flow through the remaining cells and/or carrier, there may be issues of interference and QoS degradation due to highly loaded carriers.

FIG. 1 illustrates an example, non-limiting, system 100 for cell and/or carrier switching in accordance with one or more embodiments described herein. The system 100, as well as other embodiments discussed herein, can be facilitated within various types of disaggregated architecture.

It is noted that for purposes of explanation, an O-RAN framework will be discussed. However, the disclosed embodiments are not limited to an O-RAN framework implementation and, instead, other types of disaggregated architecture can be utilized with the various embodiments discussed herein. Further, as it relates to the O-RAN framework, the network equipment can include, but is not limited to, O-RAN Radio Units (O-RUs) and Random Access Network Intelligent Controllers (RICs). Further, the disclosed embodiments are applicable to LTE, 5G, 6G, NR, and/or other advanced communication networks. The network automation tools include, but are not limited to, an rApp and an xApp.

Illustrated are two Energy Cell Groups (ESG), labeled as a first ESG 102 and a second ESG 104. ESGs are a cluster of cells, depicted by the triangles in each ESG. Each cell group, or ESG, is being controlled through respective Data Units (DUs) and Control Units (CUs). For example, the first ESG 102 is associated with a first DU 108 and a first CU 110. The second ESG 104 is associated with a second DU 112 and a second CU 114. By way of example and not limitation, the DUs can be Open RAN DUS (O-DUs) and the CUs can be Open RAN Control Units (O-CUs).

The first ESG 102 and the second ESG 104 can be locally optimized for energy efficient functioning via cell and/or carrier switch offs within the group. For example, the first ESG 102 is managed by a first xApp 116 associated with a first near-RT-RIC 118. The second ESG 104 is managed by a second xApp 120 associated with a second near-RT-RIC 122. The first near-RT-RIC 118 is illustrated as a light AI and/or ML, which indicates that the near-RT-RIC is utilized for non-intensive model training and/or model retraining. For example, inference models can be deployed at this level of the architecture. Accordingly, intensive AI and/or ML training or model deployment is not performed at the level of the near-RT-RICs.

As illustrated, a Service Management and Orchestration Framework (SMO 124) includes an rApp 126 that is associated with a non-RT-RIC 128. Since there is more data and more computing capabilities at the level of the SMO 124, this is where the training of extensive models occurs. Also, the predictive learning and transfer learning will take place within this layer (SMO 124) of the architecture.

In further detail, FIG. 2 illustrates a first equation (1) 200 for a user admission rate in accordance with one or more embodiments described herein. To jointly optimize EE and also help ensure the QoS and latency constraints are met, a utility function taking both power consumption as well as a combination of network performance indicators or KPIs (e.g., User Perceived Throughput (UPT), packets transferred, access delay, latency, and so on) per UE type (e.g., enhanced Mobile Broadband (eMBB), Ultra-Reliable Low Latency Communications (URLLC), Massive Machine Type Communication (mMTC), and so on) is provided. To avoid or mitigate frequent cell and carrier switching, it is advisable to retain the long-term performance as the objective of the optimization, instead of optimizing the immediate and/or instantaneous performance. Considering optimization for all the UEs over a period of T time slots, the optimization problem is expressed as the first equation (1) 200 of FIG. 2.

The first term of the first equation (1) 200 is a direct manifestation of the power consumption (e.g., a ratio of carriers which are in fully active state and the total number of carriers within the considered network). It is noted that the energy savings from carrier and/or cell switch off mechanisms arise due to low power consumption of Radio Unit (RU) hardware components that are in energy saving mode (e.g., sleep mode). Therefore, the NumCarriers is the sum of carriers which are in active mode and sleep mode. It can be intuitive that as more carriers are shut down, this ratio reduces.

The second term in the first equation (1) provides the percentage of UEs with QoS targets not met. Both the factors are normalized between 0 and 1, hence there is no scaling mismatch. The QoS targets are the KPIs described earlier per the UE type. Further, a is the priority parameter which defines the tradeoff between EE and QoS satisfaction KPIs.

In the disclosed embodiments, an ESG (Energy Saving Group) is considered as a cluster of RUs served using at least one DU, with co-location property. For example, coverage is provided at their location using the same at least one macro BSs (MBSs). Further, each cell and its carriers are associated with a single RU cluster at most.

According to an embodiment, provided is an rApp framework within a Service Management and Orchestration Framework (SMOF), which is used for long term decision policies and helps refine the decisions of the xApps for cell and/or carrier switch off within each ESG. Since the rApp within the Non-RT-RIC has access to a wider and more diverse database, the model trained at that layer would be more robust to abrupt changes within an ESG, something that the ESG will take more time to learn and adapt to. It can be assumed that SMOF caters to multiple ESGs, which means a larger database of UE QOS KPIs, power consumption metrics, and cell operating states. Due to its access to cloud-based storage and compute facilities, the rApp has the capability to train a global model based on the received data from multiple ESGs. The model trained at the rApp can help improve the local ESG models via federation and transfer learning-based mechanisms, through periodic model updates, for example. While transfer learning can be used to provide model parameters and/or weights which can be used instead of random initial weights and/or parameters, federated learning helps in convergence and performance improvement by transferring global model parameters from Non-RT-RIC to the xApps in the near-RT-RICs.

Also provided herein is the formulation of the RL based framework for addressing the optimization problem described above. Initially, data gathering takes place in both the proposed xApp and rApp in the near-RT-RIC and the non-RT-RIC, respectively. The main difference in data collection at the two RICs is the time granularity of the collected data. The near-RT-RIC receives UE level data counters at subframe time granularity; so central optimization throughout the ESG can ensure that individual UE QOS KPIs are met. For the non-RT-RIC, the data is aggregated at a longer time scale (e.g., 1 second) to reduce the signaling load from the DU to SMO. Also, this ensures that learning within the SMO is performed on high level statistics for the entire network.

The RL model training can be performed on a per cell level using any deep reinforcement learning algorithm. Therefore, each ESG agent within the near-RT-RIC independently learns a policy from the UE specific counters collected at the sub-frame time granularity and its interaction with the environment, while treating the other ESG agents as part of the environment. At the same time, the non-RT-RIC trains models on the sparsely collected data for each ESG and maintains a repository of ESG models. How this repository of models assists in improving performance will be described below.

Due to limited training data and absence of information about nearby ESGs, the locally trained models at different ESGs might not yield policies that work in tandem to achieve overall energy efficiency optimization. Accordingly, provided is a federated learning and transfer learning approach to enhance the local ESG model performance without centralizing the entire training data.

The federated learning approach consists of the ESG agents uploading the weights of their local RL model to a centralized coordinator within a cloud computing environment (e.g., an O-Cloud), which can be accessible to the rApp within the non-RT-RIC. The model upload can be performed automatically after multiple episodes of training in each round. At the SMO database, these local models, which may be a subset of total ESGs, are aggregated at the centralized model. There are different methods of aggregation. One method of aggregation can include selecting models on the basis of accumulated rewards. For example, ESG models that yield higher performance gain are selected to update the global model. Another method of aggregation can include aggregating all models without any preference.

Also provided herein is a method of transfer learning. As described earlier, the SMO is assumed to have trained a model for each ESG agent. When a new ESG is created, or an existing ESG is modified (e.g., addition or deletion of cells within an ESG), the existing model in the near-RT-RIC will not remain suitable for inferences. In this case, a transfer learning mechanism will be initiated.

Figure 3:
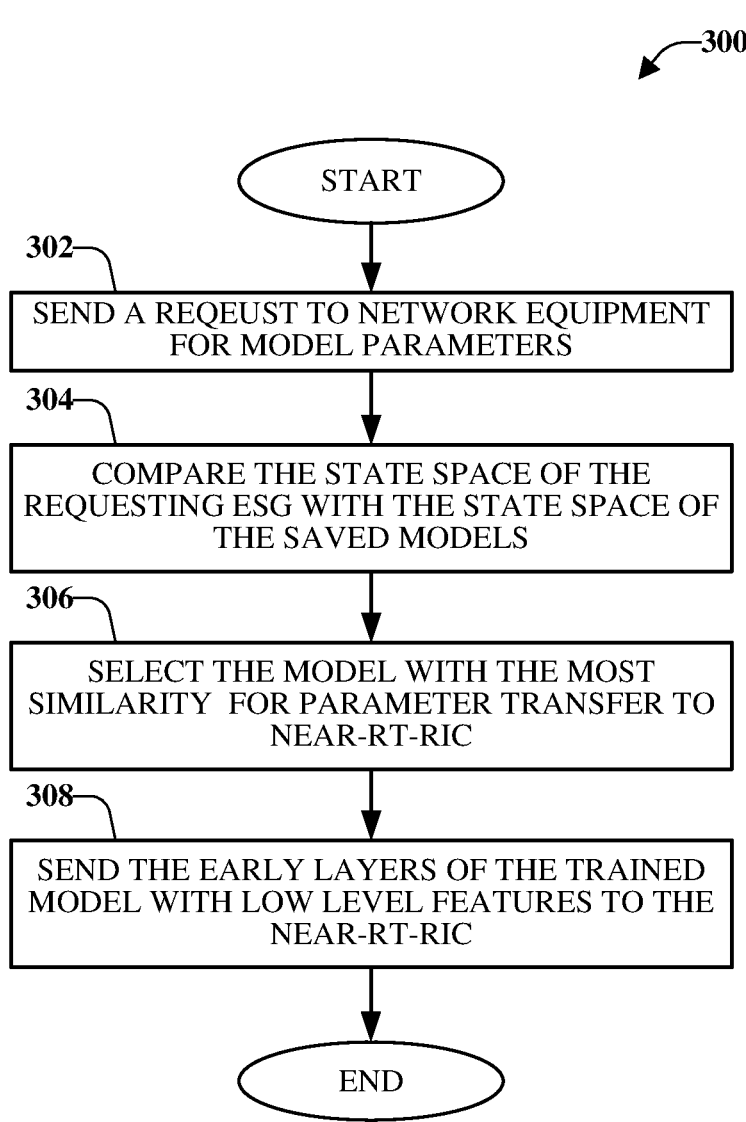
FIG. 3 illustrates a flow diagram of an example, non-limiting, computer-implemented method that facilitates transfer learning in accordance with one or more embodiments described herein.

FIG. 3 illustrates a flow diagram of an example, non-limiting, computer-implemented method 300 that facilitates transfer learning in accordance with one or more embodiments described herein. The computer-implemented method 300 and/or other methods discussed herein can be implemented by a system comprising a processor and a memory. In an example, the system can be implemented by a network equipment of a disaggregated network architecture.

The computer-implemented method 300 starts at 302, when a request is sent to network equipment for model parameters. According to an implementation, the request can be sent by an ESG agent and the network equipment can be an SMO. Further, at 304 the state space of the requesting ESG can be compared with the state space of the saved models. In an example, the comparison can be performed by a Non-RT-RIC. Multiple indices can be used to ascertain distribution similarity. Such indices include, but are not limited to, maximum mean discrepancy (MMD), Kull-back-Leibler divergence (KLD), Wasserstein distance (WD), and central moment discrepancy.

At 306, the model with the most similarity is selected for parameter transfer to the Near-RT-RIC. The model with the most similarity can be determined through distribution difference measures. At 308, the early layers of the trained model with low level features are sent, to the near-RT-RIC. The transfer learning approach through model parameter transfer enables faster convergence for the new local model of the ESG. The similarity index can be a function of multiple factors including, but not limited to, UE distribution, cell loads, propagation terrains, and so on. Since the source and target domain are identical, this would be an example of a homogeneous TL scenario.

Yet another way that the sparse data per cell at SMO can be used is, for example, running a traffic prediction model in the non-RT-RIC and transferring the predictions to near-RT-RIC. The insight on future traffic can allow the near-RT-RIC to refine its actions and proactively activate and/or disable cells and/or carriers within the ESG.

Figure 4:
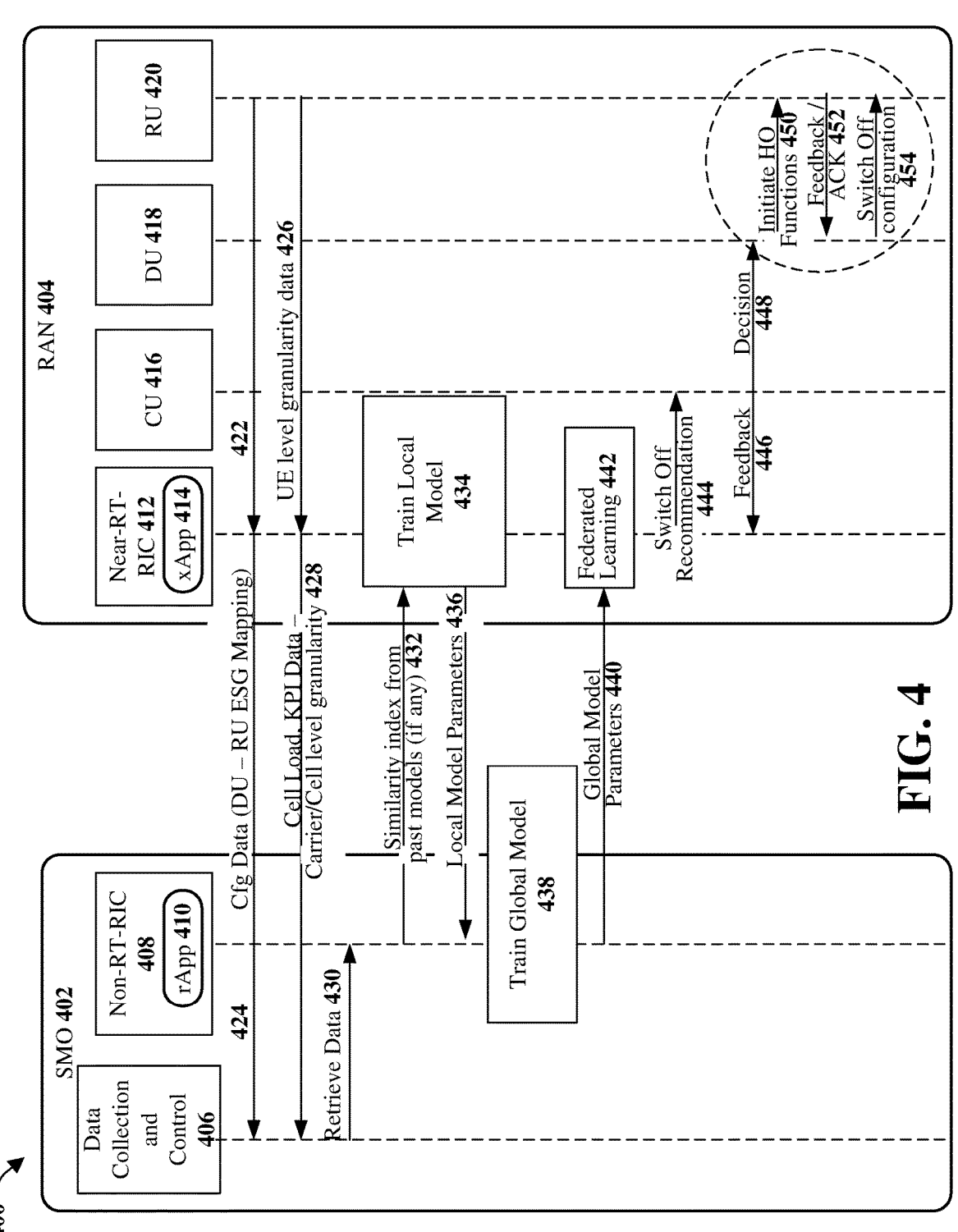
FIG. 4 illustrates an example, non-limiting, message sequence flow chart that facilitates control signaling flow for a cell and/or carrier switch off use case in accordance with one or more embodiments described herein.

FIG. 4 illustrates an example, non-limiting, message sequence flow chart 400 that facilitates control signaling flow for a cell and/or carrier switch off use case in accordance with one or more embodiments described herein. The message sequence flow chart 400 depicts an embodiment related to the control signaling flow between different network equipment for this energy saving use case. As mentioned, the disclosed embodiments are discussed with respect to an O-RAN implementation, however the disclosed embodiments are not limited to this implementation and other types of disaggregated architecture can be utilized.

Illustrated are an SMO 402 and a RAN 404, which can be an O-RAN according to an implementation. The SMO 402 includes a data collection and control portion (DCC portion 406) and a Non-RT-RIC 408 with an associated rApp 410. The RAN 404 includes a Near-RT-RIC 412 with an associated xApp 414, a CU 416, a DU 418, and an RU 420.

As depicted in FIG. 4, each DU 418 can have a demarcated region (e.g., determined by an entity the controls the network or an operator) within which it serves and operates as a central optimizer. When an ESG is formed from the RUs within a DU's demarcated geographical space, the DU and Near-RT-RIC (e.g., via ORAN Front Haul (O-FH) and O1 interfaces, respectively) begin to obtain UE specific data. The xApp 414 within the near-RT-RIC 412 can train a local online ESG level learning model from the received data. It is noted that this process can also be performed sequentially. For example, data gathering can be in the first phase and offline model training and deployment can be in the subsequent phase.

Further, there are a few options for model initiation. For example, using a similarity index, the non-RT-RIC 408 can determine if a converged model of a similar ESG is present in the non-RT-RIC repository on the cloud (e.g., cloud storage). The similarity index could be a function of the DU and UE distributions as well as the traffic demand within the ESG.

If an ESG model with high similarity is found, the model parameters can be sent so that the local model is constructed from the parameters of a converged model. Since the source domain and target domain have the same or similar features, as well as learning objectives, an inductive transfer learning model can enable faster convergence of the local ESG model. If no model is available, then random initialization can be performed.

The ESG agents within the network train the RL based models based on interaction with the environment and constant (or as often as possible) model improvement via federated learning mechanism. The reward mechanism for ESG agents is designed in such a way that it mimics the objective of the ESGs, in terms of KPI maximization while maintaining QoS thresholds. In the final step, the parameters of the global model are disseminated to all the ESGs to further refine their local models. Along with this, the history repository within SMO broadcasts a summarized record of the past observations of all ESG agents. The purpose for sharing observations of other ESG agents is to use that knowledge within intent based decision-making process. In intent-based reinforcement learning, the prior decisions of other agents are also given as input feature for improved decision making based upon the prediction and the intrinsic value. The intents of other agents are inferred as beliefs, which may be updated by Bayesian methods and/or maximum likelihood algorithms. This keeps policies of all ESGs aligned with the overarching network performance optimization objective. Each ESG selects a cell and carrier switch off policy after taking into account combination of beliefs from other agents, and then choosing the policy that maximizes the expected utility.

To avoid bias from individual ESG agents within the federated learning architecture, only a part of the RL model parameters of each ESG agent are used for aggregation in consensus. One way of implementing this is using a dueling DQN structure, based on which the selected ESGs only present their common-network and value-function parameters to the global model server for aggregation. After aggregation, each ESG model combines the newly obtained parameters and the locally trained advantage-function parameters as the new parameters of the new local DQN.

The xApp averages the data received from the E2 nodes over a defined time period of T seconds, where T can have values of, for example, 1, 5, 10 seconds, and so on, depending upon the load on the RAN interfaces. Further, the xApp applies the trained model on the averaged data to yield the proposed cell and/or carrier switch off recommendations. These recommendations are forwarded to the CU. Based on the preset limits by the operator or an upper-level data-driven policy, such as at what cell and/or carrier load level can the CU accept a switch off recommendation, the CU makes a decision on the cell and/or carrier switch off recommendations. Once the decision has been made, the CU relays this decision to MAC and/or Scheduler in the DU which implements handover configuration functions to clear out the UE buffers from the cell and/or carrier to be switched off. Upon completion of handover, the O-DU instructs the RU to switch off the cell or carrier. A similar process is followed for switching on the cell or carrier. The CU decision is also simultaneously communicated back to the xApp for future recommendation improvements. If a recommendation from xApp is not accepted by the CU, the ESG agent can receive a negative reward in the RL process. Receipt of the negative award can avoid and/or mitigate a suggestion of similar policies in the future which are likely to be rejected by the CU. This learning, model update and cell and carrier switch off activity repeats itself at a defined interval (e.g., every 10 second cycles, or another time duration).

Another embodiment is related to the RL based local ESG training model. This embodiment relates to how the elements of the state space are used to define the actions pertaining to cell and/or carrier switch off, and the reward function which is shaped exponentially to ensure faster convergence. The process can be an RL based process (e.g., the deep Q network) with the details discussed below.

It is noted that reference time values are provided with respect to the following example. Such reference time values are for example purposes only to demonstrate timing for the various message flows of the message sequence flow chart 400. However, in implementation, the timing for the message flows can be different than the timings described herein.

In further detail, at 422, configuration data is conveyed from the RU 420 to the Near-RT-RIC 412. Such conveyance can take around 10 seconds, for example. At 424, The configuration data can be forwarded, by the Near-RT-RIC 412, to the DCC portion 406. Such forwarding can take around 10 seconds, for example. The configuration data conveyed at 422 and 424 can include the DU-RU ESG mapping.

Further, at 426, UE level granularity data can be conveyed from the RU 420 to the Near-RT-RIC 412. This conveyance can take around 1 second, for example. At 428, various data is conveyed from the Near-RT-RIC 412 to the DCC portion 406, which can take around 1 second, for example. The various data can include information indicative of cell load, KPI data, and so on. Such information can be at a carrier and/or cell level granularity. The UE level granularity data, the carrier level granularity data, and/or the cell level granularity data can be retained by the DCC portion 406 at one or more data stores.

The Non-RT-RIC 408 can retrieve data from the DCC portion 406, as indicated at 428. Similarity index information from past models (e.g., historical models, models that were previously trained, and so on), if any, can be transmitted from the Non-RT-RIC 408 to the Near-RT-RIC 412, at 432.

A local model can be trained by the Near-RT-RIC 412, at 434, for cell and/or carrier switching. Training of the local model can be initiated via transfer learning, as discussed herein. Upon are after the local model is trained, local model parameters can be output, at 436, to the Non-RT-RIC 408. Outputting the local model parameters can take around 10 seconds, for example. The Non-RT-RIC 408 can train a global model, at 438. The global model training can include global model parameter aggregation, as discussed herein. Further, at 440 the global model parameters can be sent from the Non-RT-RIC 408 to the Near-RT-RIC 412 The transfer of the global model parameters can take around 10 seconds, for example.

The Near-RT-RIC 412 can train another local model at 442. The local model can be a federated learning model. For the training of the other local model at 442, local model parameters and global model parameters can be combined. An output can be local and federated model weightage decision.

Upon or after the decision is output from the other model, a cell and/or carrier switch off recommendation can be transmitted, at 444, from the Near-RT-RIC 412 to the CU 416. The CU 416 determines whether the recommendation will be accepted or not accepted and feedback related to the decision is returned to the Near-RT-RIC 412, at 446.

If the determination by the CU 416 is to accept the recommendation and turn off (or deactivate) one or more cells and/or carriers, the decision is sent, at 448, to the DU 418. Upon or after receiving the decision, the DU 418 and RU 420 exchange information during a handshake process, indicated within the dotted circle. Such information exchange can include an instruction for the RU 420 to initiate handover functions, at 450. The handover (HO) initiation moves any UEs that are being service by a cell and/or carrier that will be deactivated to another cell and/or carrier that is not being deactivated. Upon or after the handovers are completed, feedback and/or acknowledgements are sent, at 452, from the RU 420 to the DU 418. In some implementations, respective feedback and/or acknowledgements are sent per UE. Upon or after receiving an indication that all affected UEs have been successfully handed over, at 454, the DU 418 sends information indicative of a switch off configuration for the cells and/or carriers. The handshake procedure (indicated within the dotted circle) can take about 10 seconds, for example.

FIG. 5 illustrates a second equation (2) 500 that represents a state space vector in accordance with one or more embodiments described herein. Consider that an ESG is managing the recommendations for N cells and/or carriers over multiple RUs. The state space for the ESG will be an N-dimensional array, where each dimension contains a vector of counters depicting the current operational state of a cell and/or carrier. The second equation (2) 500 represents the state space vector at a time instance t.

FIG. 6 illustrates a third equation (3) 600 that represents an action space in accordance with one or more embodiments described herein. The action of an ESG for an arbitrary carrier is a binary set of {ON, OFF}. Accordingly, for an ESG with N carriers within its domain, the action space is an N-sized vector depicting the operating state (OS) of each carrier as given in third equation (3) 600.

Given that there are N carriers, where each of the carriers can be in one of the two operating states (e.g., ON, OFF). If the ESG agent randomly selects actions in the exploration phase while learning, this means that the ESG agent will select an action out of a total of 2N possible actions. Accordingly, as the number of carriers in an ESG increases, the action space increases exponentially. Selecting actions randomly to reach the convergence state will be time consuming, along with performance issues such as getting stuck in local optima.

Figures 7A, 7B:
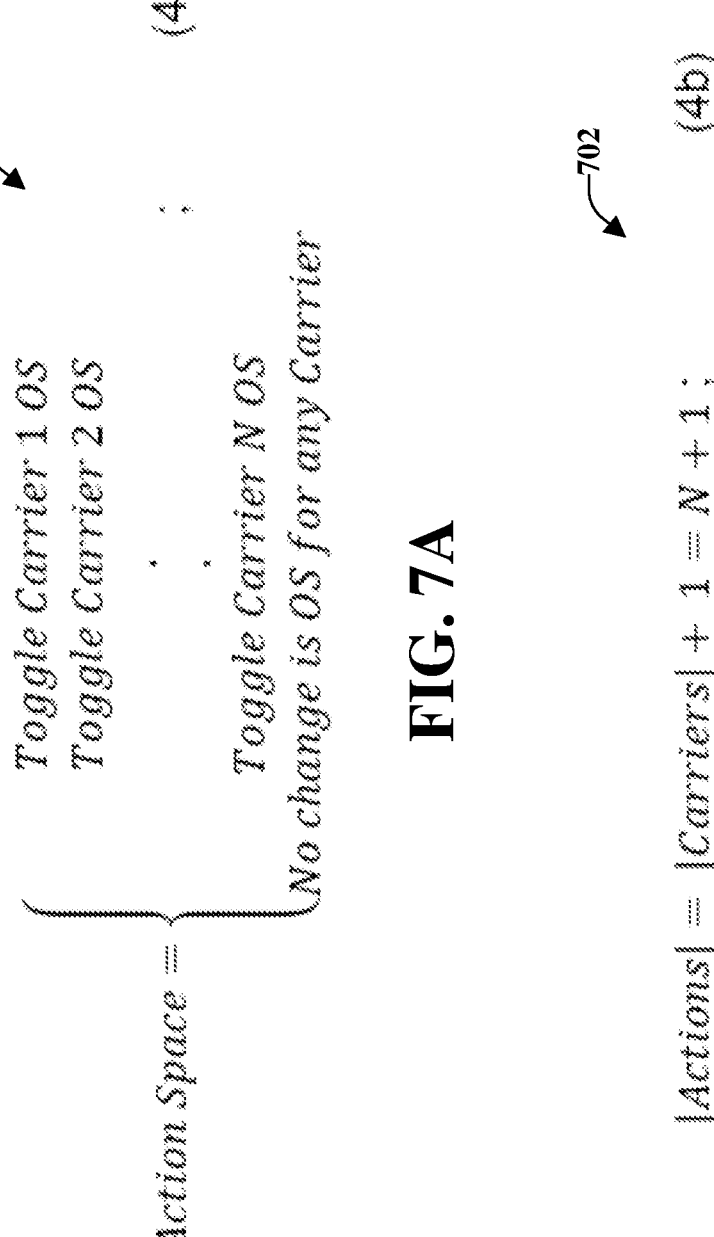
FIG. 7A illustrates a fourth equation (4A) for the action space in accordance with one or more embodiments described herein.
FIG. 7B illustrates a fifth equation (4B) that represent the action space dimensionally in accordance with one or more embodiments described herein.

Therefore, according to an implementation, the actions for the ESG agent will be to either toggle the operating point of one of the carriers or apply no changes for the next learning episode. This method of reducing DRL's action space allows each carrier to be a separate action branch that controls an individual degree of freedom. This means that during a single training and/or learning iteration, the RL model can explore a single carrier state change; or keep all carrier states unchanged. Higher exploration coefficient initially will ensure that many action states are traversed. FIG. 7A illustrates a fourth equation (4A) 700 for the action space in accordance with one or more embodiments described herein.

FIG. 7B illustrates a fifth equation (4B) 702 that represents the action space dimensionally in accordance with one or more embodiments described herein. The first term in the fifth equation (4B) 702 is for toggling, while the second term corresponds to the case of unchanged operating mode for all carriers and cells scenario. Accordingly, the action space has been essentially reduced from 2N to N+1, which can ensure faster convergence.

FIG. 8 illustrates equations (5) and (6) 800 that represent a long-term reward function in accordance with one or more embodiments described herein. The reward function for the agents reflects the objective function utility supplemented with a reward shaping function for faster convergence of the algorithm. Using replay memory within RL, the agents will utilize their prior observations and state space for speedy decision making without the undesirable temporal correlations. Along with this, the history repository within the central SMO will be utilized to improve actions based on other agents' intents. To facilitate faster convergence, an exponential function-based reward shaping can be applied. The exponential function-based reward shaping can yield higher rewards for actions that provide close to the optimal utility values. This amplification of difference between values of the utility function creates a discerning of difference between agents' action allows acceleration of the stochastic gradient descent (SGD) algorithm in the DNN.

An invalid action in this use case may be the ESG agent recommending two neighboring cells to be switched off simultaneously. This can cause severe loss of coverage to the UEs within their footprints. Another instance of an invalid action is when a cell and/or carrier shut down suggested by the ESG agent results in an overall power consumption increase of the ESG, in situations such as when the load on the nearby cell where the traffic is shifted is increased so much that the power amplifier (PA) bias must be increased to cater for the higher load on the cell. Those invalid actions may be determined by a RIC xApp controller or a conflict arbitration module. In this case, e is a constant with a negligible positive value to ensure the first bracket in the utility function does not become 0. The QoS satisfaction rate is the percentage of UEs within the ESG with their KPI thresholds satisfied. These thresholds depend on the device categories. For example, an eMBB device may have SINR or throughput as its QoS satisfaction KPI, while a URLLC device may have service latency as its KPI. While the disclosed embodiments aim to minimize power consumption, the overall QoS satisfaction rate, if degraded, will penalize the agents by reducing their reward, hence policies with the right tradeoff between the two will be selected per ESG.

Provided herein are mechanisms for a cell and/or carrier switch off within a disaggregated architecture of network equipment with an aim to reduce the network power consumption through switching off one or more carriers and/or a cell of a given radio access technology. According to an example, the disaggregated architecture can be an Open RAN (O-RAN) framework, but the aspects are not limited to this type of framework.

Several embodiments are provided to outline the ways in which the proposed methods can be employed in network design. The AI and/or ML processes that will be deployed at different entities (e.g., RICs) of the disaggregated architecture along with the flow of data and signaling for algorithmic learning, and policy executions have been provided.

The design of the cell and/or carrier switch off uses a unique set up of the disaggregated architecture with the control signaling between different entities to allow AI and/or ML model trainings at multiple RAN intelligent controllers (RICs) with different sparsity of data. Also provided are embodiments for federated learning, transfer learning, and incentive-based deep reinforcement learning in order to perform cell and/or carrier switch off with the overarching goal of improving energy efficiency while maintaining quality-of-service (QOS) satisfaction for a traffic network with multiple device types; each having diverse data requirements.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 s) control of RAN elements and their resources through applications, e.g., specialized applications called rApps. Example, non-limiting Near-Real Time RAN Intelligent Controller (Near-RT RIC) functions enable near-real-time optimization and control and data monitoring of CU and DU nodes in near-RT timescales (e.g., a second range of time representing less time than the first time range, such as between 10 millisecond (ms) and 1 second(s)). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to handle network functions at real time timescales (e.g., a third range of time representing less time than the first time range and the second time range, such as <10 ms).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
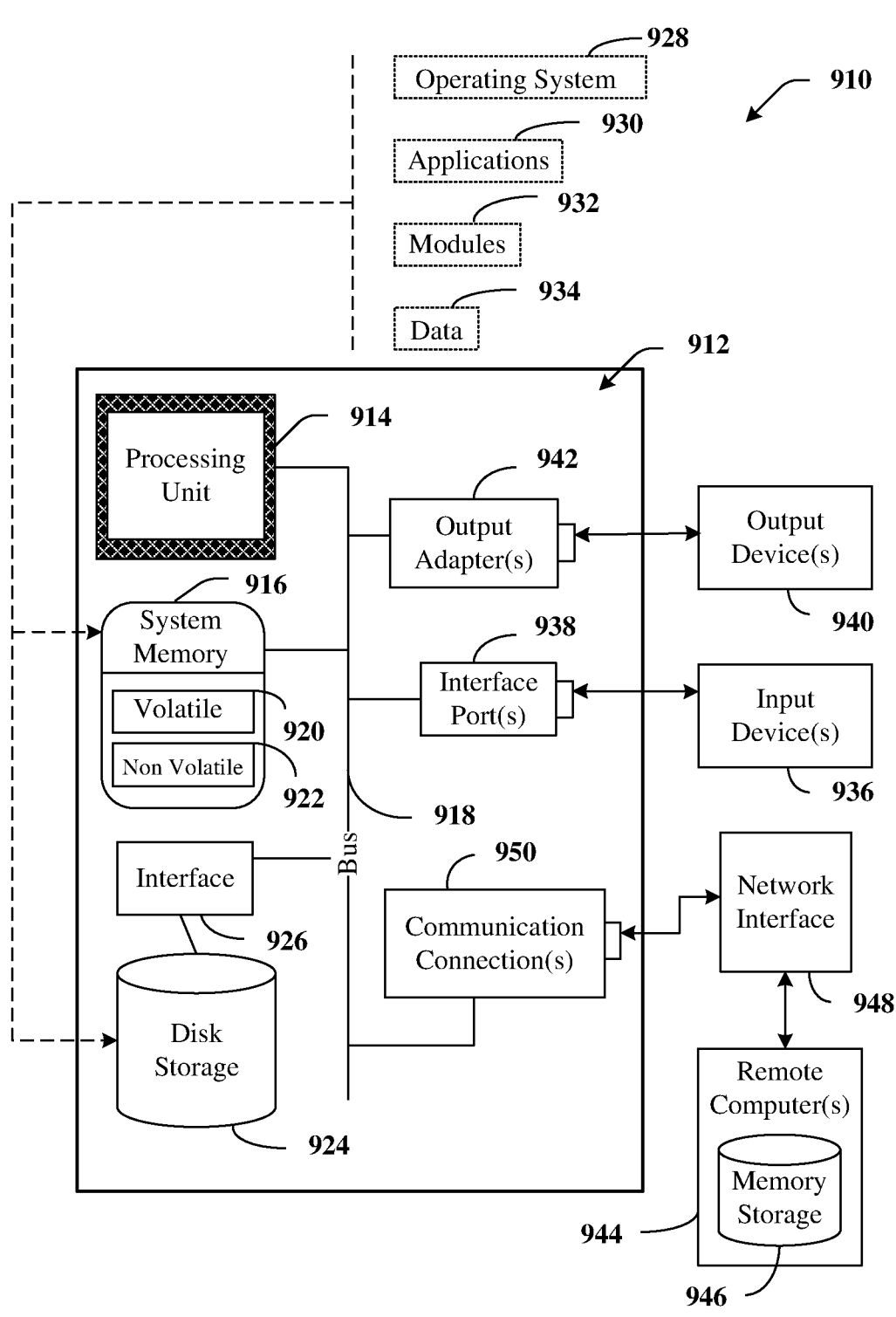
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 can use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
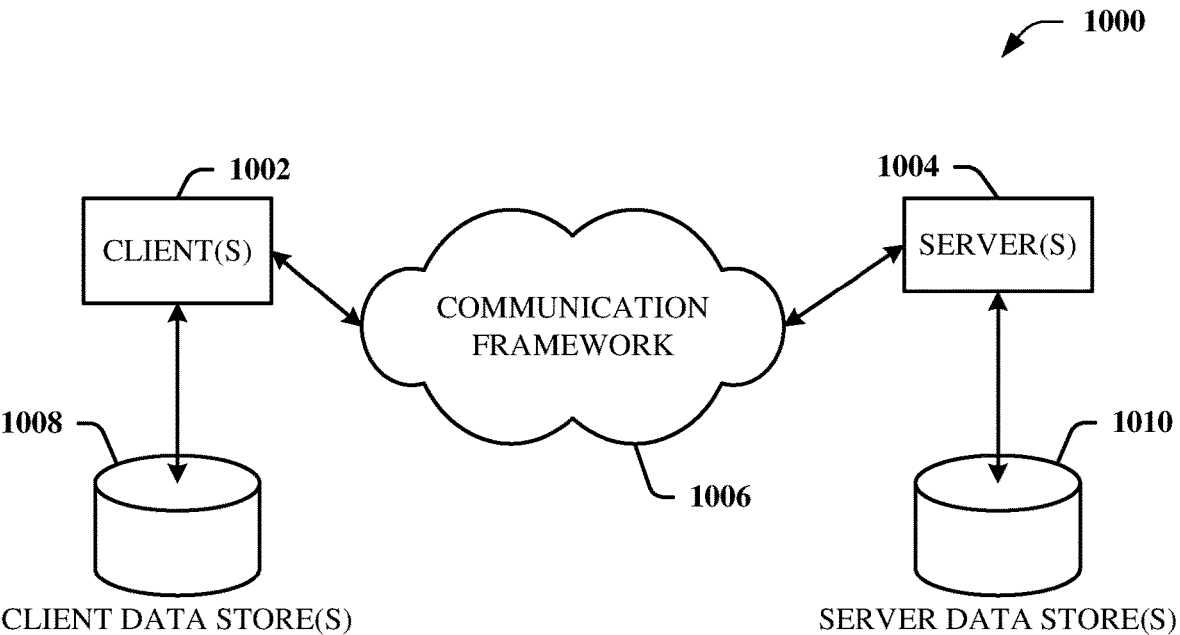
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers

1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration.

Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, when the term "set" is used (e.g., "a set of carriers," "a set of cells," and so on) it means a non-zero set, 'at least one', or 'one or more'. In a similar manner, when the term subset is used, it means a non-zero set, 'at least one', or 'one or more'.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a system comprising at least one processor, a first result of a utility function associated with a first configuration of a set of carriers that service a group of user equipment in a communication network, wherein the first configuration is based on respective activation states of carriers of the set of carriers, and wherein the utility function is based on a power consumption of the set of carriers and a quality of service target for the group of user equipment;

based on respective traffic patterns of user equipment of the group of user equipment, evaluating, by the system, respective results of the utility function for respective configurations of a group of configurations, other than the first configuration, for the set of carriers; and selecting, by the system, a second configuration from the group of configurations based on a second result of the utility function for the second configuration being determined to be a higher value than a value of the first result, wherein the determining comprises deriving the power consumption of the set of carriers based on a ratio of a first amount that represents a number of carriers in a fully active state and a second amount that represents a total number of carriers in the communication network, and wherein the total number of carriers comprises a first quantity of carriers in an active mode and a second quantity of carriers in a sleep mode.

2. The method of claim 1, wherein the evaluating the respective results of the utility function for the respective configurations of the group of configurations comprises:

employing, by the system, artificial intelligence to simulate toggling of a state of at least one carrier of the set of carriers between an active state and an inactive state.

3. The method of claim 1, wherein the evaluating comprises using a metric based on a long-term performance expectation as an objective of the utility function.

4. The method of claim 1, wherein the evaluating comprises:

determining the first result and the second result based on the utility function being a combination of respective metrics representative of the power consumption, a latency, and a performance of the communication network.

5. The method of claim 1, further comprising:

aggregating, by the system, respective weights of local models, resulting in a centralized model, wherein the local models are associated with energy saving groups comprising network equipment; and updating, by the system, a global model based on the centralized model.

6. The method of claim 5, wherein the local models are federated learning models.

7. The method of claim 5, wherein the local models are transfer learning models.

8. The method of claim 5, wherein the local models are federated learning models and transfer learning models.

9. The method of claim 1, wherein the system is implemented within a disaggregated architecture that comprises central units, distributed units, and a near-real-time-radio access network intelligent controller.

10. The method of claim 1, wherein the communication network is configured to operate according to a new radio network communication protocol.

11. A system, comprising:

at least one processor; and at least one memory that stores executable instructions that, when executed by the processor, facilitate performance of operations, comprising:

based on respective traffic patterns of user equipment of a group of user equipment, evaluating respective results of a utility function for respective configurations of a group of configurations of a set of carriers that service the group of user equipment in a communication network, wherein the utility function is based on a power consumption of the set of carriers and a quality of service target for the group of user equipment; and based on a result of the utility function for one configuration of the group of configurations being determined to have a first value that is more than a second value of a current result of the utility function, implementing the one configuration in the communication network, wherein the group of configurations comprise different combinations of active and inactive carriers of the set of carriers, and wherein the evaluating the respective results comprises:

initiating a local model with initial parameters via transfer learning; and training the local model with an aggregation of global model parameters via federated learning.

12. The system of claim 11, wherein the operations further comprise:

receiving feedback data associated with the implementing of the one configuration; and retraining the local model based, at least in part, on the feedback data.

13. The system of claim 11, wherein the evaluating comprises using a metric based on a long-term performance expectation as an objective of the utility function.

14. The system of claim 11, wherein the respective results of the utility function are based on a combination of respective metrics representative of the power consumption, a latency, and a performance of the communication network for the respective configurations.

15. The system of claim 11, wherein the system is deployed in a disaggregated architecture of network equipment.

16. A non-transitory machine-readable medium, comprising executable instructions that, when executed by at least one processor of network equipment, facilitate performance of operations, comprising:

determining a first result of a utility function associated with a first configuration of a set of carriers that service a group of user equipment in a communication network, wherein the first configuration is based on respective activation states of carriers of the set of carriers, and wherein the utility function is based on a power consumption of the set of carriers and a quality of service target for the group of user equipment;

based on respective traffic patterns of user equipment of the group of user equipment, evaluating respective results of the utility function for respective configurations of a group of configurations, other than the first configuration; and selecting a second configuration from the group of configurations based on a second result of the utility function for the second configuration being determined to be increased as compared to the first result, wherein the determining comprises deriving the power consumption of the set of carriers based on a ratio of a first amount that represents a number of carriers in a fully active state and a second amount that represents a total number of carriers in the communication network, and wherein the total number of carriers comprises a first quantity of carriers in an active mode and a second quantity of carriers in a sleep mode.

17. The non-transitory machine-readable medium of claim 16, wherein the evaluating the respective results comprises:

initiating a local model with initial parameters via transfer learning; and training the local model with an aggregation of global model parameters via federated learning.

18. The non-transitory machine-readable medium of claim 16, wherein the evaluating comprises:

determining the first result and the second result based on the utility function being a combination of respective metrics representative of the power consumption, a latency, and a performance of the communication network.

19. The non-transitory machine-readable medium of claim 16, wherein the operations further comprise:

aggregating respective weights of local models, resulting in a centralized model, wherein the local models are associated with energy saving groups comprising network equipment; and updating a global model based on the centralized model.

20. The non-transitory machine-readable medium of claim 19, wherein the local models are federated learning models, transfer learning models, or both federated learning models and transfer learning models.

* * * * *